United States Patent [19]

Yanagihara

[11] Patent Number: 5,317,413

[45] Date of Patent: May 31, 1994

[54] DIGITAL HIGH-DEFINITION VIDEO SIGNAL RECORDING AND REPRODUCING APPARATUS

[75] Inventor: Naofumi Yanagihara, Tokyo, Japan

[73] Assignee: Sony Corporation, Tokyo, Japan

[21] Appl. No.: 971,061

[22] Filed: Nov. 3, 1992

[30] Foreign Application Priority Data

Nov. 12, 1991 [JP] Japan ............................. 3-295842

[51] Int. Cl.$^5$ ........................ H04N 5/76; H04N 5/782
[52] U.S. Cl. ................................... 358/335; 360/8; 360/32; 348/340; 348/607
[58] Field of Search ............. 358/11, 12, 133, 135, 358/140, 141, 310, 335, 906, 909, 327, 328, 340, 339, 166, 167, 336; 360/8, 32; H04N 5/76, 5/78.1, 5/78, 5/78.2, 9/79, 11/20, 11/06, 7/12, 7/01, 7/04, 5/225, 5/95, 5/91, 514, 5/208, 5/92, 5/213, 5/94

[56] References Cited

U.S. PATENT DOCUMENTS

| | | | |
|---|---|---|---|
| 4,864,396 | 9/1989 | Martens ........................ | 358/133 |
| 4,943,855 | 7/1990 | Bheda et al. ................. | 358/133 |
| 5,001,561 | 3/1991 | Haskell et al. ................ | 358/133 |
| 5,032,925 | 7/1991 | Ganse et al. .................. | 358/310 |
| 5,032,927 | 7/1991 | Watanabe et al. ............. | 358/310 |

Primary Examiner—Tommy P. Chin
Assistant Examiner—Thai Tran
Attorney, Agent, or Firm—William S. Frommer; Alvin Sinderbrand

[57] ABSTRACT

A high-definition signal (HD) is separated to prevent the quality of an image from being deteriorated when the high-definition signal is mixed with a standard video signal. A low band signal of the HD signal from a decimation circuit (5) is supplied through a discrete cosine transform circuit (7), a quantizer circuit (8), a variable length coder circuit (9) and an encoder circuit (11) to a recording head (12). A signal from the quantizer circuit (8) is supplied through an inverse quantizer circuit (17) to a subtracter circuit (18). A signal from the discrete cosine transform circuit (7) is supplied to the subtracter circuit (18), thereby forming a difference signal between a decoded signal of the compresses signal and the original signal. This difference signal is supplied through a quantizer circuit (19) a run length coding circuit (20) and a variable length coder circuit (21) to an adder circuit (16). A high band signal of the HD signal from the decimation circuit (6) is supplied through a quantizer circuit (13), a run length coder circuit (14) and a variable length coder circuit (15) to the adder circuit (16). Then, a signal from the adder circuit (16) is supplied through an encoder circuit 22 to a recording head 23.

10 Claims, 6 Drawing Sheets

DIGITAL HIGH-DEFINITION VIDEO SIGNAL RECORDING AND REPRODUCING APPARATUS

BACKGROUND OF THE INVENTION

1. Field of the Invention

The present invention relates to a digital video tape recorder (digital VTR) which can record and reproduce a digital high-definition video signal and a standard digital video signal with a compatibility.

2. Description of the Prior Art

Professional digital video tape recorders that can record and reproduce a high-definition video signal (hereinafter simply referred to as an HD signal) in the form of a digital signal have already been developed and become commercially available. If the digital video tape recorder has a compatibility with a conventional standard digital video signal (hereinafter simply referred to as an SD signal) when it is modified as a consumer digital video tape recorder, then it can be expected that consumer digital video tape recorders will be popularized smoothly, in particular, at the transition stage. The assignee of the present application has previously proposed a video signal recording system in which a compatibility between the HD signal and the SD signal can be established (see Japanese Laid-Open Patent Publication No. 3-79155).

FIG. 1 of the accompanying drawings shows in block form an arrangement of a recording system of a digital video tape recorder that employs such a previously-proposed video signal recording system.

As shown in FIG. 1, a high-definition video signal (HD signal) is supplied to an input terminal 61. The HD signal applied to the input terminal 61 is supplied to an analog-to-digital (A/D) converter circuit 6, in which it is sampled at a sampling frequency of 40.5 MHz, for example, and also encoded in a predetermined encoding manner to provide a digital signal composed of a full-scanning line luminance signal and line-sequential color difference signals, for example. This digital signal is what might be called a 12:4:0 digital signal.

This digital signal is supplied to a low-pass filter (LPF) 63 which separates the sub band in the vertical direction, for example, and a high-pass filter (HPF) 64. The low-pass filter 63 and the high-pass filter 64 are each formed of a so-called QMF filter. Output signals of the low-pass filter 63 and the high-pass filter 64 are respectively supplied to and decimated to ½ by decimation circuits 65, 66, thereby forming a so-called 6:2:0 digital signal having a sampling frequency of 20.25 MHz that is matched with that of the digital signal of the SD signal which will be described later on.

An output signal from the decimation circuit 65 is supplied to a discrete cosine transform (DCT) circuit 67 which is used to compress data. An output signal from the discrete cosine transform circuit 67 is supplied to and quantized by a quantizer ($Q_1$) circuit 68 so that the bit rate of the recording signal becomes 25 Mbps, for example. A signal from the quantizer circuit 68 is supplied to a variable length coder (VLC) circuit 69 and the signal thus processed by the variable length coder circuit 69 is supplied through a switch 70 to an encoder (ENC) circuit 71. The signal supplied to the encoder circuit 71 is processed in a predetermined recording signal processing fashion such as an error correction or the like and then fed to a recording head 72.

A signal from the decimation circuit 66 is supplied to and quantized by a quantizer ($Q_3$) circuit 73 so that the bit rate of the recording signal becomes 25 Mbps, for example. A signal from the quantizer circuit 73 is supplied to a run length coder (RLC) circuit 74. A signal from the run length coder circuit 74 is supplied to a variable length coder (VLC) circuit 75. The signal thus processed by the variable length coder circuit 75 is supplied to an encoder (ENC) circuit 76, in which it is processed in a predetermined recording signal processing fashion such as an error correction or the like, and then fed to a recording head 77. Therefore, the HD signal is recorded on a tape (not shown) at the bit rate of $25 + 25 = 50$ Mbps by the recording heads 72, 77.

A standard video signal (SD signal) is supplied to an input terminal 78. The SD signal applied to the input terminal 78 is supplied to an A/D converter circuit 79, in which it is sampled by a sampling frequency of 20.25 MHz, for example, and encoded in a predetermined encoding fashion to provide a so-called 6:2:0 digital signal composed of a full-scanning line luminance signal and line-sequential color difference signals. In the digital signal of the SD signal, the SD signal has an aspect ratio of 16:9. The present invention is not limited thereto and can be applied to the case such that the SD signal has an aspect ratio of 4:3 (e.g., 4:2:0 digital signal having a sampling frequency of 13.5 MHz).

A signal from the A/D converter circuit 79 is supplied to a discrete cosine transform (DCT) circuit 80 that is used to compress data, for example. A signal from the discrete cosine transform circuit 80 is supplied to and quantized by a quantizer ($Q_1'$) circuit 81 such that the bit rate of the recording signal becomes 25 Mbps, for example. A signal from the quantizer circuit 81 is supplied to a variable length coder (VLC) circuit 82 and the signal thus processed by the variable length coder circuit 82 is supplied to the switch 70.

Therefore, a high band signal of the HD signal and a low band signal of the HD signal or the SD signal are respectively recorded on alternate tracks as shown by a track pattern of FIG. 2 of the accompanying drawings. Therefore, the HD signal can be reproduced by reproducing all of these tracks and the SD signal can be reproduced by reproducing the tracks of the SD signal. The low band signal can be reproduced as the SD signal by reproducing the tracks of the low band signal of the HD signal, thereby achieving a compatibility between the HD signal and the SD signal.

According to the above conventional apparatus, the HD signal is separated into vertical sub band signals and then decoded as schematically shown in FIG. 3 of the accompanying drawings, for example.

As shown in FIG. 3, a signal applied to an input terminal 91 is supplied to a high-pass filter (HPF) 92 and a low-pass filter (LPF) 93. Each of the high-pass filter 92 and the low-pass filter 93 is formed of the so-called QMF filter. Output signals from the high-pass filter 92 and the low-pass filter 93 are supplied to decimation circuits 94, 95 and thereby being decimated to ½, respectively. The decimated signals from these decimation circuits 94, 95 are supplied to a transmission system 96 through which a recording signal and a reproduced signal are transmitted.

Signals from the transmission system 96 are supplied to interpolation circuits 97, 98, in which the decimated signals are interpolated. Signals from these interpolation circuits 97, 98 are supplied to filters 99, 100. These filters 99, 100 also are formed of the so-called QMF filters and output signals of these filters 99, 100 are added by an adder circuit 101 and then delivered to an output terminal 102.

The QMF is an FIR (finite impulse response) filter that is formed of a series circuit of a plurality of 1H (H is a horizontal period) delay circuits. $x_{(n)}$ assumes an input signal to the circuit and $[\;x]_{(n)}$ assumes an output signal of this circuit (where $[\;x]$ represents the overlapping state of the input and output signals). Further, response characteristics of the filters 92, 93, 99 and 100 are defined as:

92: $H_{1(z)} = Z[h_{(n)}]$
93: $H_{2(z)} = H_{1(-z)} = Z[-1)^n h_{(n)}]$
99: $H_{1(z)}: h_{(n)}$
100: $-H_{1(z)} = -H1(-z) = Z[(-1)^{n+1} h_{(n)}]$ where $Z[\;]$ represents the Z conversion.

Thus, the response characteristic of the entire circuit is expressed by the following equation (1):

$$X(z) = \frac{1}{2}[H_1^2(z) - H_1^2(-z)]X(z) \quad (1)$$

If the following equation (2) is satisfied, $$H_2(\omega) = H_1(\omega + \pi)$$
$$H(\omega) = H(z)|_{z=e^{j\omega}} \quad (2)$$

then the frequency response characteristic is expressed as:

$$\hat{X}(\omega) = \frac{1}{2}[H_1^2(\omega) - H_1^2(\omega + \pi)]X(\omega) \quad (3)$$

Accordingly, using a symmetric FIR filter having taps the number of which is M as an QMF filter yields:

$$H_1(\omega) = |H_1(\omega)|e^{-j\frac{M-1}{2}\omega} \quad (4)$$

Therefore, the frequency response is expressed as:

$$\hat{X}(\omega) = \quad (5)$$
$$\frac{1}{2} \cdot e^{-j(M-1)\omega}[|H_1(\omega)|^2 - |H_1(\omega + \pi)|^2 \cdot e^{-j(M-1)\pi}] \cdot X(\omega)$$

Further, if M is even, then the above frequency response is expressed as:

$$\hat{X}(\omega) = \frac{1}{2} \cdot e^{-j(M-1)\omega}[|H_1(\omega)|^2 + |H_1(\omega + \pi)|^2] \cdot X(\omega) \quad (6)$$

Accordingly, if the following equation (7) is satisfied, $$|H_1(\omega)|^2 + |H_1(\omega + \pi)|^2 = 1 \quad (7)$$

then, in the output signal $[\;x]_{(n)}$, after the HD signal of the input signal $x_{(n)}$ is separated into the sub band signals of the vertical direction and then transmitted, these sub band signals can be synthesized and decoded from a theory standpoint. FIG. 4 of the accompanying drawings shows an example of frequency characteristics of the respective filters and FIG. 5 of the accompanying drawings shows an example of impulse responses of the taps of the QMF filter.

In the above conventional apparatus, the low band signal which results from separating the HD signal into the sub band signals of the vertical direction is quantized in accordance with the bit rate of the SD signal by the quantizer circuit 68 and a large amount of data are reduced, thereby causing a distortion to occur due to the quantization. As a consequence, if the low band signal and the high band signal having distortions are synthesized to restore the HD signal upon playback, the quality of the reproduced image will be deteriorated.

When the above-mentioned discrete cosine transform (DCT) is carried out as a data compressing method in order to record the HD signal, the energy is concentrated in particular, in the low band. Therefore, if the low band signal is quantized at the quantization amount corresponding to the bit rate of the SD signal, then a large distortion occurs in the low band signal. Consequently, when the low band signal and the high band signal are synthesized to provide the HD signal, the distortion is increased more, thereby the quality of the reproduced image being deteriorated remarkably.

OBJECTS AND SUMMARY OF THE INVENTION

Therefore, it is an object of the present invention to provide an improved digital video signal recording and reproducing apparatus in which the aforesaid shortcomings and disadvantages of the prior art can be eliminated.

More specifically, it is an object of the present invention to provide a digital video signal recording and reproducing apparatus in which a distortion occurred in a low band signal can be eliminated by using a difference signal.

It is another object of the present invention to provide a digital video signal recording and reproducing apparatus in which a quality of image when a digital high-definition video signal is restored by synthesizing a high band signal and a low band signal can be improved.

It is a further object of the present invention to provide a digital video signal recording and reproducing apparatus in which a compatibility between a digital high-definition video signal and a digital standard video signal can be established.

It is an additional object of the present invention to provide a digital video signal recording and reproducing apparatus which is suitably applied to a consumer digital video tape recorder.

As a first aspect of the present invention, an apparatus for recording a digital video signal is comprised of a band-separating circuit for separating a digital high-definition video signal formed at a predetermined bit rate to provide a high band signal and a low band signal, a signal compressing circuit for compressing a bit rate of the low band signal so that the low band signal becomes equivalent to a standard digital video signal, a difference signal forming circuit for forming a difference signal between a signal, which results from restoring the compressed signal, and the low band signal, a coding circuit for coding the low band signal and a synthesized signal of the difference signal and the high band signal so that a bit rate of a synthesized signal becomes a bit rate of the standard digital video signal, and a recording device for recording the coded low band signal and the coded synthesized signal on separate tracks on a magnetic tape.

As a second aspect of the present invention, an apparatus for recording and reproducing a digital video signal is comprised of a band-separating circuit for separating a digital high-definition video signal formed at a predetermined bit rate to provide a high band signal and a low band signal, a signal compressing circuit for compressing a bit rate of the low band signal so that the low band signal becomes equivalent to a standard digital video signal, a difference signal forming circuit for forming a difference signal between a signal, which results from restoring the compressed signal, and the low band signal, a coding circuit for coding the low band signal and a synthesized signal of the difference signal and the high band signal so that a bit rate of a synthesized signal becomes a bit rate of the standard digital video signal, a recording device for recording the coded low band signal and the coded synthesized signal on separate tracks on a magnetic tape, a reproducing circuit for reproducing the low band signal and the synthesized signal from the magnetic tape, a decoding circuit for decoding the reproduced synthesized signal to provide the difference signal and the high band signal, a first synthesizing circuit for synthesizing the reproduced low band signal and the difference signal, a signal expanding circuit for inversely converting an output of the first synthesizing circuit, and a second synthesizing circuit for synthesizing an output of the signal expanding circuit and the reproduced high band signal from the decoding circuit to provide the digital high-definition video signal.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the accompanying drawings.

Figures 1, 2:
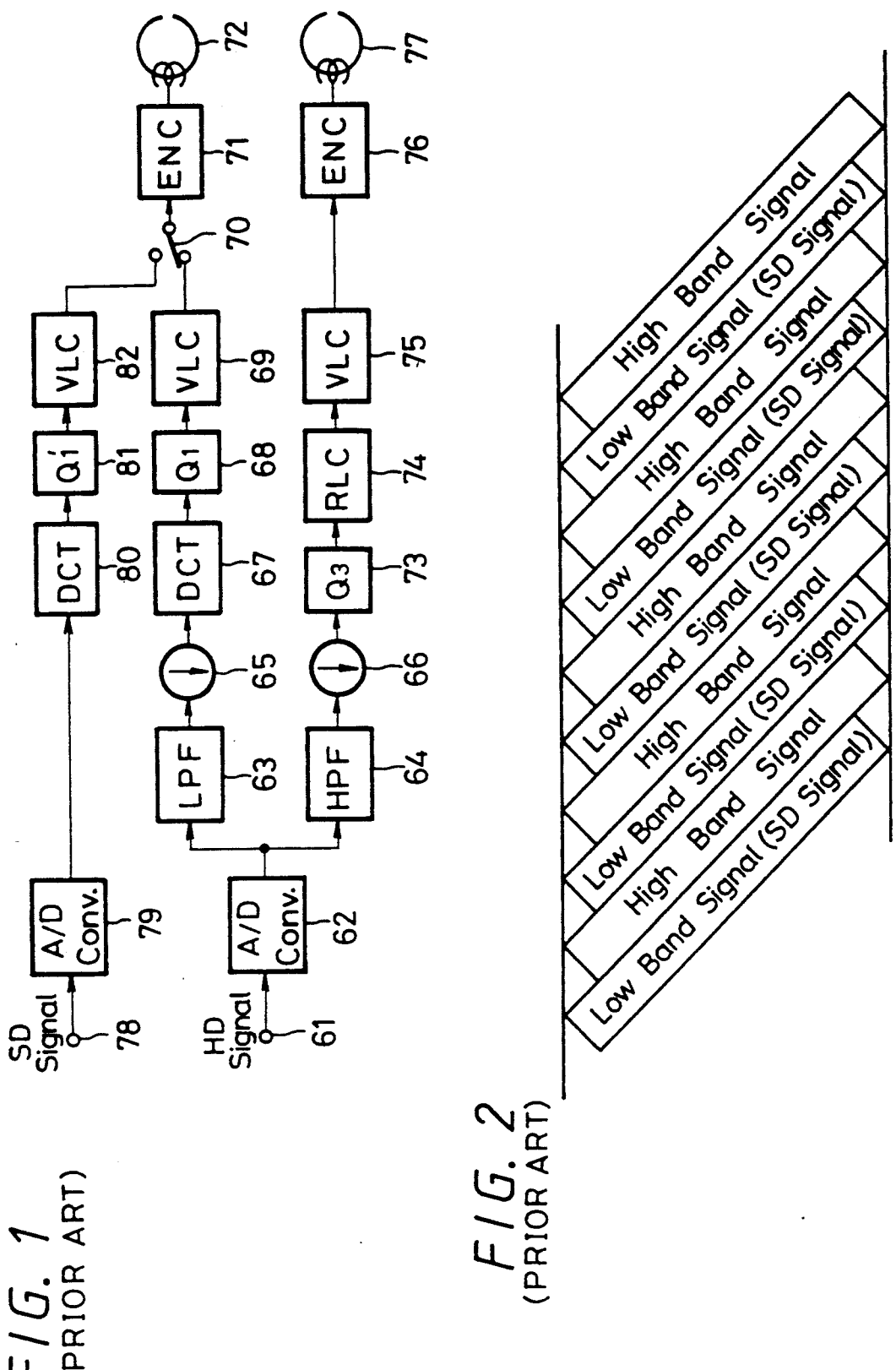
FIG. 1 is a block diagram showing a recording system of a conventional digital video tape recorder.
FIG. 2 is a diagram showing a track pattern of the recording system of the conventional digital video tape recorder shown in FIG. 1.
Figure 3:
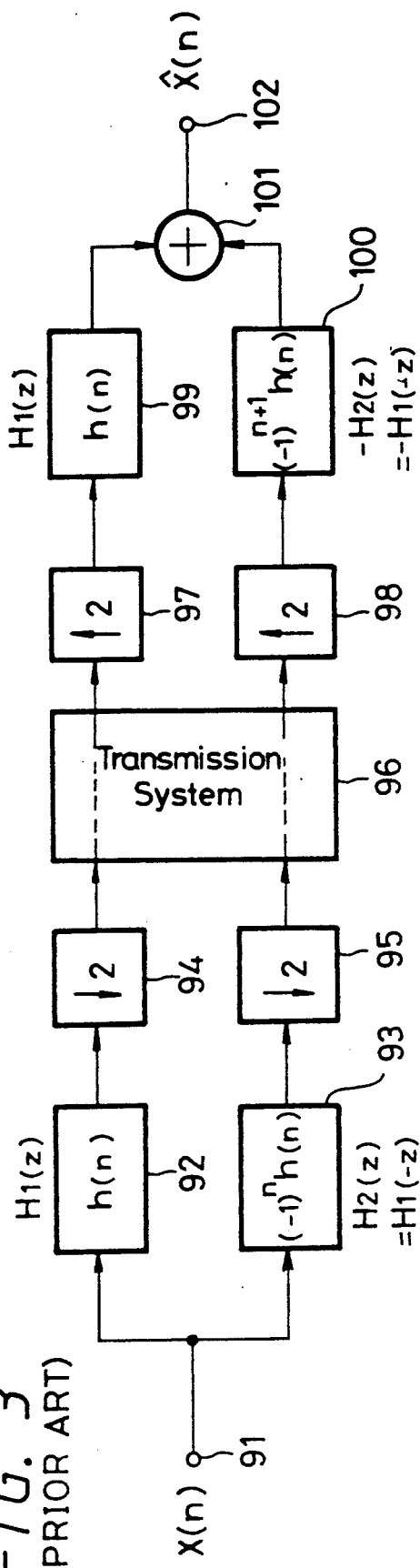
FIG. 3 is a block diagram used to explain operation in which a sub band signal in the vertical direction is separated and then decoded.
Figure 4:
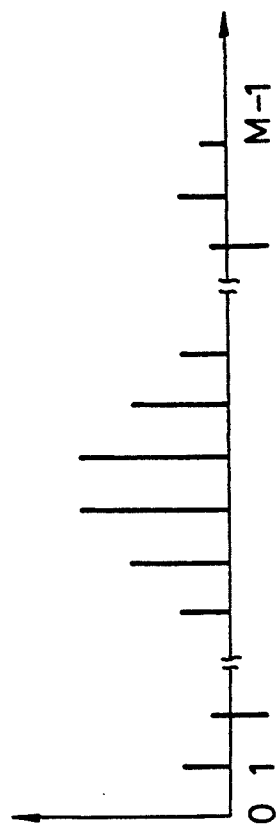
FIG. 4 is a frequency characteristic graph used to explain frequency characteristics of respective filters.
Figure 5:
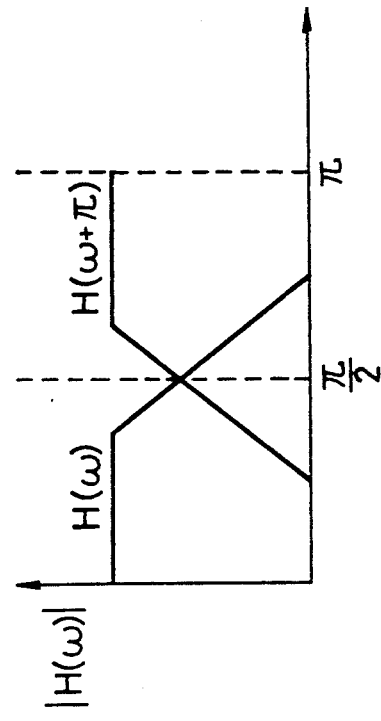
FIG. 5 is a diagram showing an example of an impulse response of a tap of a filter.
Figure 6:
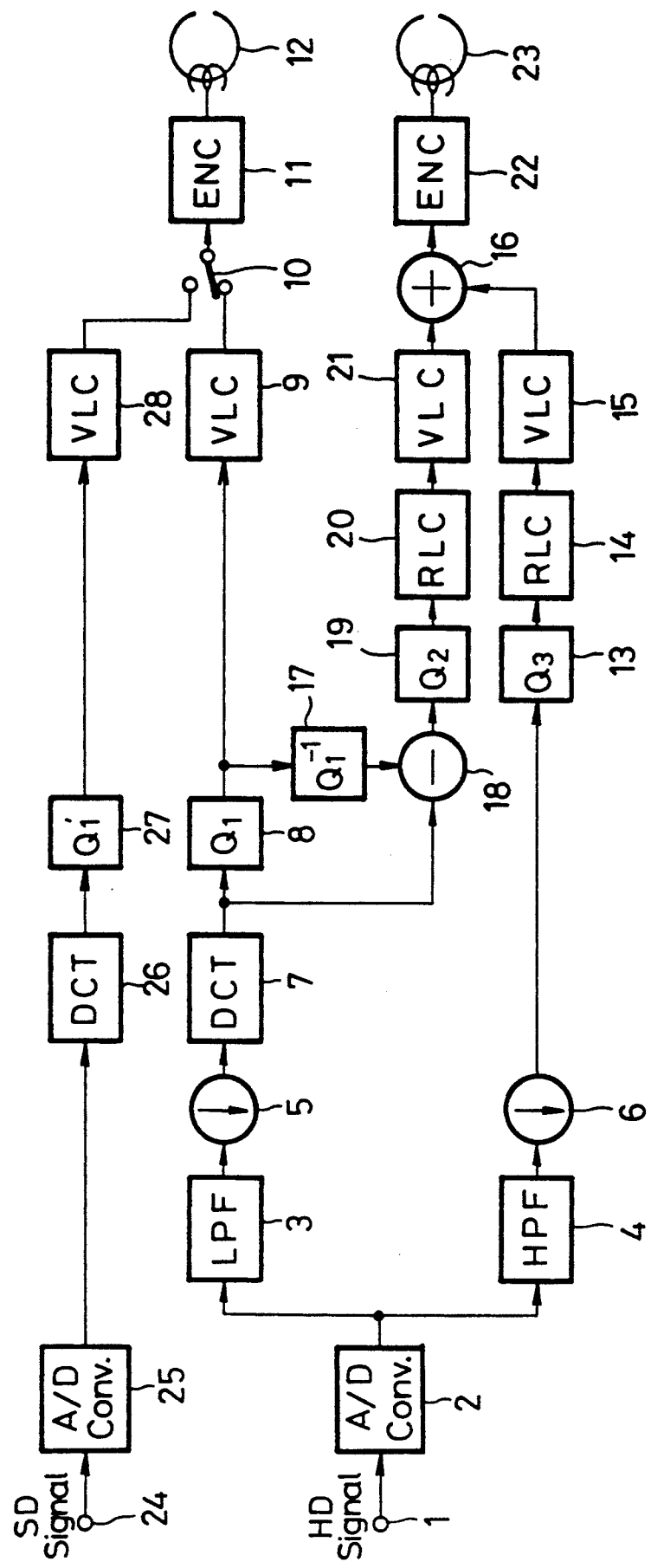
FIG. 6 is a block diagram showing a recording system of a digital video tape recorder according to a first embodiment of the present invention.

FIG. 6 of the accompanying drawings shows in block form an arrangement of a recording system of a digital video tape recorder according to a first embodiment of the present invention.

Referring to FIG. 6, the high-definition video signal (HD signal) is applied to an input terminal 1. The HD signal applied to the input terminal 1 is supplied to an A/D converter circuit 2, in which it is sampled at a sampling frequency of 40.5 MHz, for example, and then encoded in a predetermined encoding manner to provide a so-called 12:4:0 digital signal composed of the fill-scanning line luminance signal and line-sequential color difference signals.

This digital signal is supplied to a low-pass filter (LPF) 3 which carries out the sub-band separation in the vertical direction and a high-pass filter (HPF) 4. The low-pass filter 3 and the high-pass filter 4 are formed of the so-called QMF filters. Output signals from these filters 3, 4 are supplied to decimation circuits 5, 6, in which they are decimated to ½ to provide a so-called 6:2:0 digital signal matched with the digital signal of the SD signal and whose sampling frequency is 20.25 MHz.

A signal from the decimation circuit 5 is supplied to a discrete cosine transform (DCT) circuit 7 that is used to compress data. A signal from the discrete cosine transform circuit 7 is supplied to and quantized by a quantizer ($Q_1$) circuit 8 so that the bit rate of the recording signal becomes 25 Mbps, for example. A signal from the quantizer circuit 8 is supplied to a variable length coder (VLC) circuit 9, and the signal thus processed by the variable length coder circuit 9 is supplied through a switch 10 to an encoder (ENC) circuit 11. The signal supplied to the encoder circuit 11 is processed in a proper recording signal processing fashion such as an error correction or the like and then fed to a recording head 12.

A signal from the decimation circuit 6 is supplied to and quantized by a quantizer ($Q_3$) circuit 13 so that the bit rate of the recording signal becomes 12.5 Mbps, for example. A signal from the quantizer circuit 13 is supplied to a run length coder (RLC) circuit 14. A signal from the run length coder circuit 14 is supplied to a variable length coder (VLC) circuit 15, from which the run-length-coded signal is supplied to an adder circuit 16.

The output signal from the quantizer circuit 8 is supplied through an inverse quantizer ($Q_1^{-1}$) circuit 17 to a subtracter circuit 18. Also, the output signal of the discrete cosine transform circuit 7 is supplied to the subtracter circuit 18. Therefore, the subtracter circuit 18 generates a difference signal between the restored signal of the compressed signal and the original signal. This difference signal is supplied to and quantized by a quantizer ($Q_2$) circuit 19 so that the bit rate of the recording signal becomes 12.5 Mbps, for example. A signal from the quantizer circuit 19 is supplied to a run length coder (RLC) circuit 20. Then, a signal from the run length coder circuit 20 is supplied to a variable length coder (VLC) circuit 21, from which the variable-length-coded signal is supplied to the adder circuit 16. Therefore, the adder circuit 16 generates a synthesized signal of 12.5+12.5=25 Mbps.

The synthesized signal from the adder circuit 16 is supplied to an encoder (ENC) circuit 22, in which it is processed in a proper recording signal processing fashion such as an error correction or the like and then supplied to a recording head 23. Therefore, the recording heads 12 and 23 record the HD signal at the recording bit rate of 25+25=50 Mbps.

A standard video signal (SD signal) is supplied to an input terminal 24. The SD signal applied to the input terminal 24 is supplied to an A/D converter circuit 25, in which it is sampled at a sampling frequency of 20.25 MHz and also encoded in a predetermined encoding processing fashion to provide a so-called 6:2:0 digital signal composed of a full-scanning line luminance signal and line-sequential color difference signals. While the digital signal of this SD signal has the SD signal whose aspect ratio is 16:9, the present invention is not limited thereto and can be applied to the digital signal of the SD signal whose aspect ratio is 4:3 (e.g., 4:2:0 digital signal having a sampling frequency of 13.5 MHz).

A signal from the A/D converter circuit 25 is supplied to a discrete cosine transform (DCT) circuit 26 which is used to compress data. A signal from the discrete cosine transform circuit 26 is supplied to and quantized by a quantizer ($Q_1'$) circuit 27 so that the bit rate of the recording signal becomes 25 Mbps, for example. A signal from the quantizer circuit 27 is supplied to a variable length coder (VLC) circuit 28, from which the variable-length-coded signal is supplied to the switch 10. Thus, the synthesized signal of the high band signal of the HD signal and the difference signal and the low band signal of the HD signal or the HD signal are recorded on alternate tracks on the tape in a track pattern similar to that of the prior art.

Figure 7:
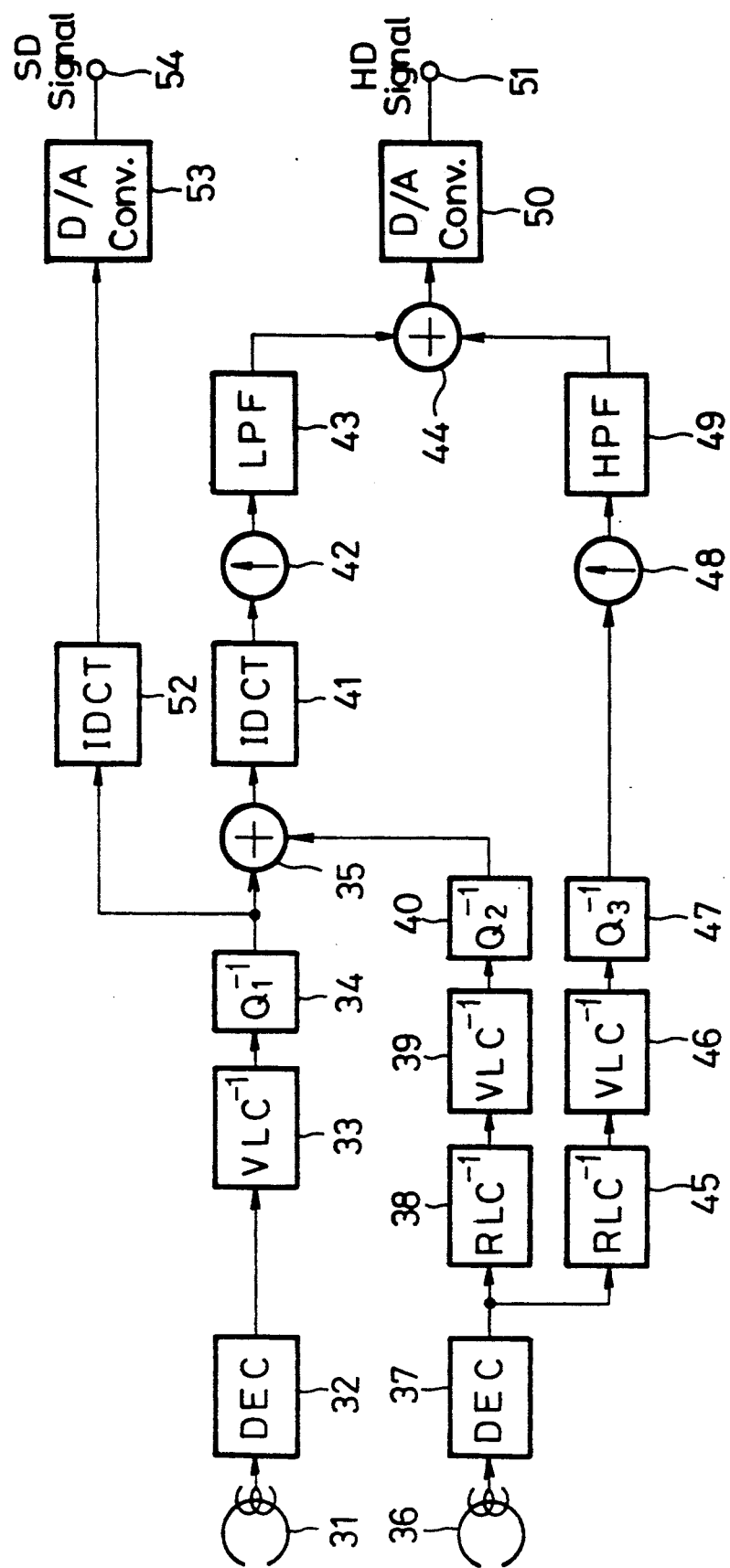
FIG. 7 is a block diagram showing a reproducing system of the digital video tape recorder according to the first embodiment of the present invention.

FIG. 7 of the accompanying drawings shows in block form an arrangement of the reproducing system of the digital video tape recorder.

In FIG. 7, reference numeral 31 depicts a playback head which reproduces the tracks of the low band signal of the HD signal or the SD signal. A signal from the playback head 31 is supplied to a decoder (DEC) circuit 32, in which it is processed in a predetermined playback signal processing fashion such as an error correction or the like in association with the above-mentioned encoder circuit 11. A signal from the decoder circuit 32 is supplied to a variable length decoder ($VLC^{-1}$) circuit 33. The thus variable-length-decoded signal is supplied to an inverse quantizer ($Q_1^{-1}$) circuit 33, in which the recording signal that was quantized by the quantizer circuit 8 so as to have the bit rate of 25 Mbps, for example, is inversely quantized. A signal from the inverse quantizer circuit 34 is supplied to an adder circuit 35.

In FIG. 7, reference numeral 36 depicts a playback head which reproduces a track of a synthesized signal of the high band signal of the HD signal and the difference signal. A signal from the playback head 36 is supplied to a decoder (DEC) circuit 37, in which it is processed in a predetermined playback signal processing fashion such as an error correction or the like in association with the above mentioned encoder circuit 22. A signal corresponding to the difference signal of the HD signal from the decoder circuit 37 is supplied to a run length decoder ($RLC^{-1}$) circuit 38. The signal thus run-length-decoded is supplied to a variable length decoder ($VLC^{-1}$) circuit 39. The signal thus variable-length-decoded is supplied to an inverse quantizer ($Q_2^{-1}$) circuit 40, in which the recording signal that was quantized by the quantizer circuit 19 so as to have the bit rate of 12.5 Mbps, for example is inversely quantized. A signal from the inverse quantizer circuit 40 is supplied to the adder circuit 35.

Therefore, the adder circuit 35 derives a signal that corresponds to the low band signal of the HD signal whose distortion is eliminated by the addition of the difference signal. The signal from the adder circuit 35 is supplied to a inverse discrete cosine transform (IDCT) circuit 41, for example. A signal from the inverse discrete cosine transform circuit 41 is supplied to an interpolation circuit 42 and thereby interpolated to be twice, for example. A signal from the interpolation circuit 42 is supplied through a low-pass filter (LPF) circuit 43 to an adder circuit 44.

A signal corresponding to the high band signal of the HD signal from the decoder circuit 37 is supplied to a run length decoder ($RLC^{-1}$) circuit 45 whose run-length-decoded signal is supplied to a variable length decoder ($VLC^{-1}$) circuit 46. The signal thus variable-length-decoded is supplied to an inverse quantizer ($Q_3^{-1}$) circuit 47 which inversely quantizes the recording signal that was quantized by the quantizer circuit 13 so as to have the bit rate of 12.5 Mbps, for example. A signal from the inverse quantizer circuit 47 is supplied to an interpolation circuit 48, in which it is interpolated to be twice, for example. A signal from the interpolation circuit 48 is supplied through a high-pass filter (HPF) 49 to the adder circuit 44. These low-pass filter 43 and the high-pass filter 47 are formed of the so-called QMF filters.

Thus, the adder circuit 44 adds the high band signal of the HD signal and the difference signal to generate the low band signal of the HD signal whose distortion is eliminated, thereby restoring the original HD signal. The thus restored HD signal is supplied to a D/A converter circuit 50, in which it is converted into an analog HD signal and then supplied to an output terminal 51.

A signal from the inverse quantizer circuit 34 is supplied to an inverse discrete cosine transform (IDCT) circuit 52, for example. Then, a signal from the inverse discrete cosine transform circuit 52 is supplied to a D/A converter circuit 53, in which it is converted into an analog SD signal and then fed to an output terminal 54.

Therefore, according to this apparatus, the HD signal can be reproduced by reproducing all recorded track and also reproduce the SD signal by reproducing the tracks of the SD signal. Further, by reproducing the tracks of the low band signal of the HD signal, this signal can be reproduced as the SD signal. Consequently, a compatibility between the HD signal and the SD signal can be established.

In that case, since the low band signal of the HD signal to be reproduced is eliminated in distortion by the addition of the difference signal, it is possible to prevent the quality of reproduced image from being deteriorated when the HD signal is restored by synthesizing the low band signal and the high band signal. When the low band signal of the HD signal is reproduced as the SD signal, it is frequently observed that a distortion occurs. However, when the low band signal is employed alone, a distortion is not increased so much and such distortion falls within a tolerance range considering the case that the HD signal is reproduced as the SD signal.

As described above, according to the above-mentioned apparatus, the difference signal (subtracter circuit 18) between the restored (inverse quantizer circuit 17) signal of the compressed signal and the original signal is recorded and reproduced separately and a distortion in the low band signal can be eliminated by using this difference signal. Therefore, the quality of image provided when the HD signal is restored by synthesizing the high band signal and the low band signal can be improved.

Figure 8:
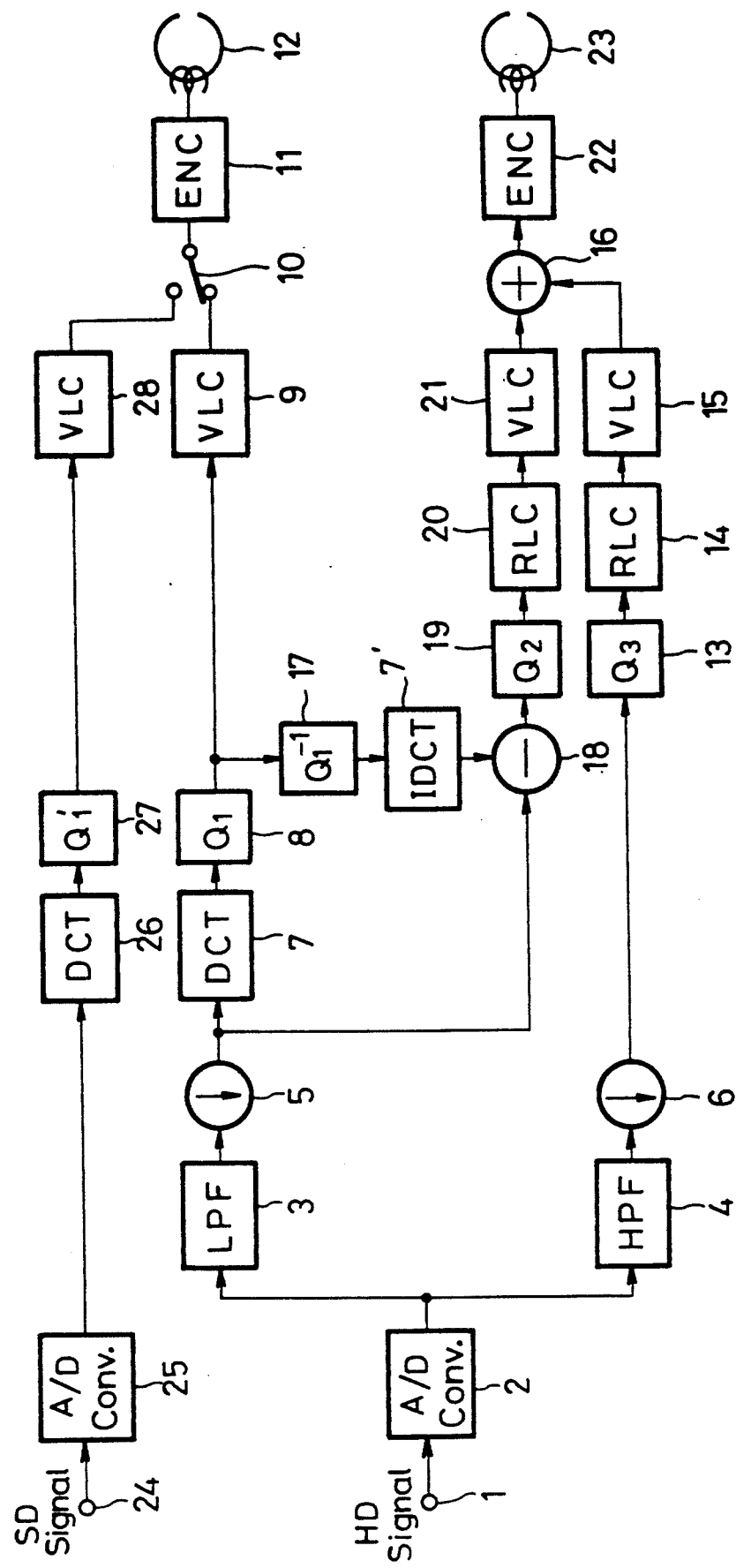
FIG. 8 is a block diagram showing the recording system of the digital video tape recorder according to a second embodiment of the present invention.
Figure 9:
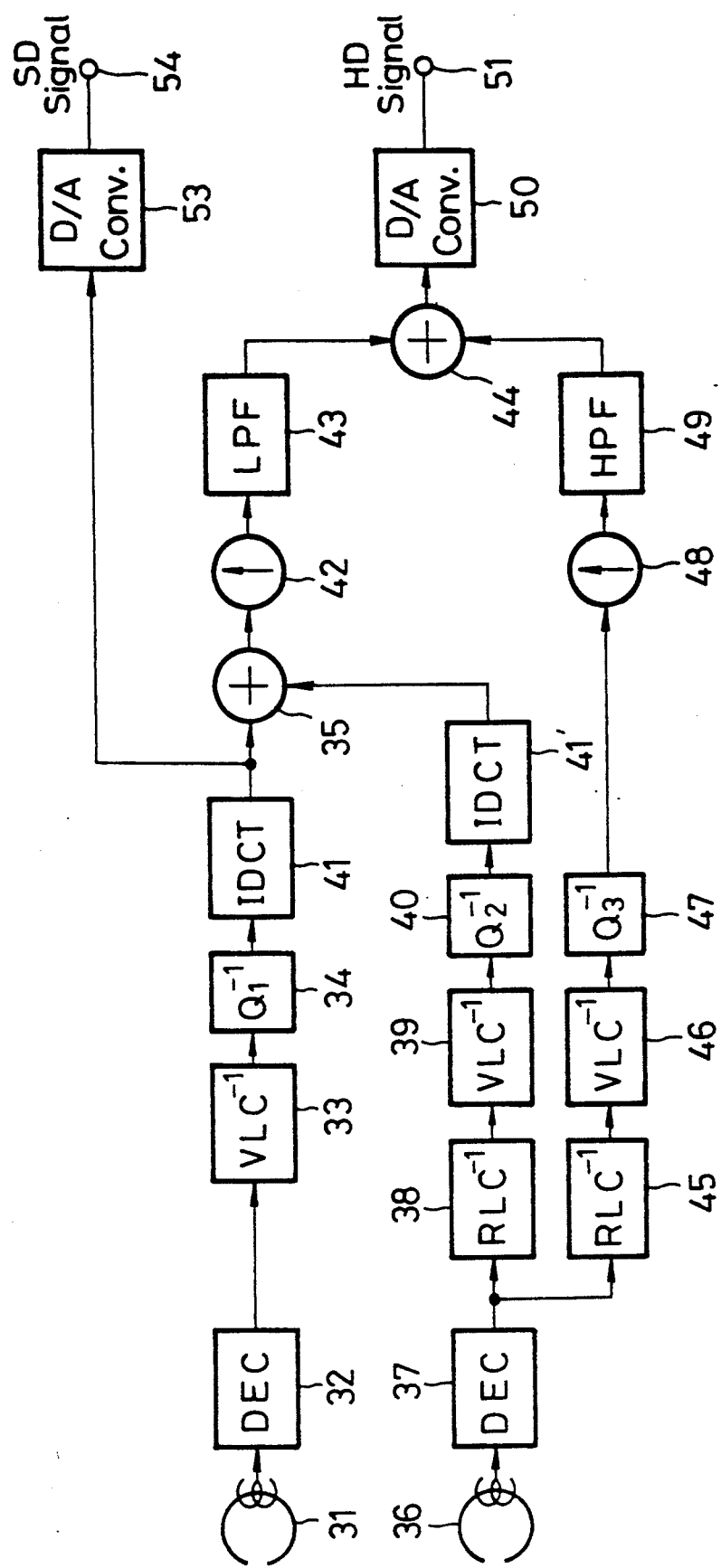
FIG. 9 is a block diagram showing the reproducing system of the digital video tape recorder according to the second embodiment of the present invention.

FIGS. 8 and 9 of the accompanying drawings show in block form an arrangement of a recording system and an arrangement of a reproducing system of the digital video tape recorder according to a second embodiment of the present invention. In FIGS. 8 and 9, like parts corresponding to those of the first embodiment are marked with the same references and therefore need not be described in detail.

According to this embodiment, as shown in FIG. 8, a difference signal of the recording system is formed between an output signal of and an input signal to the discrete cosine transform (DCT) circuit 7, for example. In this case, the input signal to the discrete cosine transform circuit 7 is supplied to the subtracter circuit 18, and the output signal of the inverse quantizer ($Q_1^{-1}$) circuit 17 is supplied to the subtracter circuit 18 through the inverse discrete cosine transform (IDCT) circuit 7′, for example, that corresponds to the discrete cosine transform (DCT) circuit 7.

In the reproducing system shown in FIG. 9, the signal from the inverse quantizer ($Q_1^{-1}$) circuit 34 is supplied through the inverse discrete cosine transform (IDCT) circuit 41, for example, to the adder circuit 35. Also, the signal from the inverse quantizer ($Q_2^{-1}$) circuit 40 is supplied to the adder circuit 35 through the inverse discrete cosine transform (IDCT) circuit 41′, for example.

According to this embodiment, similarly as described above, the HD signal can be reproduced by reproducing all recorded tracks, and the SD signal can be reproduced by reproducing the tracks of the SD signal. Further, by reproducing the tracks of the low band signal of the SD signal, this signal can be reproduced as the SD signal, thereby establishing the compatibility between the HD signal and the SD signal.

According to this embodiment, the distortion occurred in the discrete cosine transform (DCT) circuit 7 also can be eliminated and it is generally considered that this distortion is not so large.

According to the present invention, the difference signal between the restored signal of the compressed signal and the original signal is recorded and reproduced separately and a distortion in the low band signal can be eliminated by using this difference signal. Therefore, the quality of image provided when the HD signal is restored by synthesizing the high band signal and the low band signal can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for recording a digital video signal comprising:
   band-separating means for separating a digital high-definition video signal formed at a predetermined bit rate to provide a high band signal and a low band signal;
   signal compressing means for compressing a bit rate of said low band signal so that said low band signal becomes equivalent to a standard digital video signal;
   restoring means coupled to said signal compressing means for restoring the compressed low band signal to provide a restored signal;
   difference signal generating means for generating a difference signal comprised of a difference between said low band signal and said restored signal;
   synthesizing means for producing a synthesized signal by combining said difference signal and said high band signal;
   coding means for coding said low band signal and said synthesized signal so that a bit rate of said synthesized signal becomes a bit rate of said standard digital video signal; and
   recording means for recording said coded low band signal and said coded synthesized signal on separate tracks on a magnetic tape.

2. The apparatus according to claim 1, wherein said signal compressing means comprises an orthogonal converting means.

3. The apparatus according to claim 2, wherein said orthogonal converting means comprises a discrete cosine transform (DCT) circuit.

4. The apparatus according to claim 2, wherein said signal compressing means further comprises quantizing means and variable length coding means.

5. The apparatus according to claim 1, wherein said coding means comprises run length coding means.

6. The apparatus according to claim 5, wherein said coding means further comprises quantizing means and variable length coding means.

7. The apparatus according to claim 1, wherein said band-separating means comprises a vertical subband filter.

8. The apparatus according to claim 2, further comprising quantizing means for quantizing an output produced by said orthogonal converting means, thereby producing a quantized signal, and inverse quantizing means for producing an inverse quantization of said quantized signal; and wherein the difference signal generated by said difference signal generating means is comprised of a difference between said output produced by said orthogonal converting means and said inverse quantization.

9. The apparatus according to claim 2, further comprising quantizing means for quantizing an output produced by said orthogonal converting means, inverse quantizing means coupled to said quantizing means for producing an inverse quantized signal and inverse orthogonal converting means coupled to said inverse quantizing means for performing inverse orthogonal conversion to produce said restored signal.

10. An apparatus for recording and reproducing a digital video signal comprising:
   band-separating means for separating a digital high-definition video signal formed at a predetermined bit rate to provide a high band signal and a low band signal of respective bit rates;
   signal compressing means for compressing the bit rate of said low band signal so that said low band signal becomes equivalent to a standard digital video signal;
   restoring means coupled to said signal compressing means for restoring the compressed low band signal to provide a restored signal;
   difference signal generating means for generating a difference signal comprised of a difference between said low band signal and said restored signal;
   synthesizing means for producing a synthesized signal by combining said difference signal and said high band signal;

coding means for coding said low band signal and said synthesized signal so that a bit rate of said synthesized signal becomes a bit rate of said standard digital video signal;

recording means for recording said coded low band signal and said coded synthesized signal on separate tracks on a magnetic tape;

reproducing means for reproducing said coded low band signal and said coded synthesized signal from said magnetic tape;

decoding means for decoding said reproduced synthesized signal to recover said difference signal and said high band signal;

means for synthesizing from said reproduced low -band signal and said difference signal a compressed signal corresponding to the low band signal of the high-definition video signal;

signal expanding means for inversely compressing the compressed signal corresponding to the low band signal of the high-definition video signal; and means for synthesizing from an output of said signal expanding means and said high band signal recovered by said decoding means to provide said digital high-definition video signal.

* * * * *